US011450186B2

(12) United States Patent
Kamio et al.

(10) Patent No.: US 11,450,186 B2
(45) Date of Patent: Sep. 20, 2022

(54) PERSON MONITORING SYSTEM AND PERSON MONITORING METHOD

(71) Applicant: PANASONIC I-PRO SENSING SOLUTIONS CO., LTD., Fukuoka (JP)

(72) Inventors: Takashi Kamio, Kanagawa (JP); Eisaku Miyata, Kanagawa (JP); Koji Yano, Kanagawa (JP); Norio Saitou, Kanagawa (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/884,582

(22) Filed: May 27, 2020

(65) Prior Publication Data

US 2020/0380833 A1 Dec. 3, 2020

(30) Foreign Application Priority Data

May 30, 2019 (JP) .............................. JP2019-101815

(51) Int. Cl.
G08B 13/196 (2006.01)
H04N 7/18 (2006.01)
(Continued)

(52) U.S. Cl.
CPC ......... *G08B 13/19613* (2013.01); *G07C 9/10* (2020.01); *G08B 13/19608* (2013.01); *G08B 13/19656* (2013.01); *H04N 7/183* (2013.01); *G06V 10/22* (2022.01); *G06V 40/173* (2022.01); *G06V 40/178* (2022.01); *G06V 40/50* (2022.01)

(58) Field of Classification Search
CPC ......... H04N 7/183; G06K 2009/00322; G06K 9/00295; G06K 9/00926; G06K 9/2054; G06K 9/00228; G06K 9/00771; G07C 9/10; G07C 9/253; G07C 9/27; G07C 9/28;
(Continued)

(56) References Cited

U.S. PATENT DOCUMENTS 9,922,048 B1* 3/2018 Milliorn ............... G06V 40/172
10,032,326 B1* 7/2018 Landers, Jr. ............. G07C 9/38
(Continued)

FOREIGN PATENT DOCUMENTS

JP 2017-054355 3/2017

*Primary Examiner* — Dakshesh D Parikh
(74) *Attorney, Agent, or Firm* — Greenblum & Bernstein, P.L.C.

(57) ABSTRACT

There is provided a person monitoring system including at least one camera and a server that is communicably connected to the at least one camera. The server, based on reception of detection information of a predetermined event from a gate that regulates passage in response to a detection of the predetermined event, requests a first camera, that captures an image of a capturing area including the gate, for a face image of a person near the gate when the predetermined event occurs. The first camera captures an image of the person near the gate when the predetermined event occurs and transmits, to the server, a face image obtained by cutting out a range having a face of the person from the image of the person. The server outputs alarm information based on the face image and register the face image in a database.

9 Claims, 10 Drawing Sheets

(51) Int. Cl.
  *G07C 9/10* (2020.01)
  *G06V 10/22* (2022.01)
  *G06V 40/50* (2022.01)
  *G06V 40/16* (2022.01)

(58) Field of Classification Search
  CPC ........ G08B 13/19608; G08B 13/19613; G08B 13/19656; G08B 13/248
  See application file for complete search history.

(56) References Cited

U.S. PATENT DOCUMENTS

| | | | |
|---|---|---|---|
| 2013/0266181 A1* | 10/2013 | Brewer | G06V 40/174 |
| | | | 382/103 |
| 2014/0347479 A1* | 11/2014 | Givon | H04N 21/4415 |
| | | | 348/143 |
| 2016/0231886 A1* | 8/2016 | Jo | A61B 5/7425 |
| 2016/0371535 A1* | 12/2016 | Li | G06V 40/172 |
| 2018/0239953 A1* | 8/2018 | Miwa | G06K 9/00228 |
| 2020/0057885 A1* | 2/2020 | Rao | G06V 40/50 |
| 2020/0327315 A1* | 10/2020 | Mullins | G06K 9/00771 |

* cited by examiner

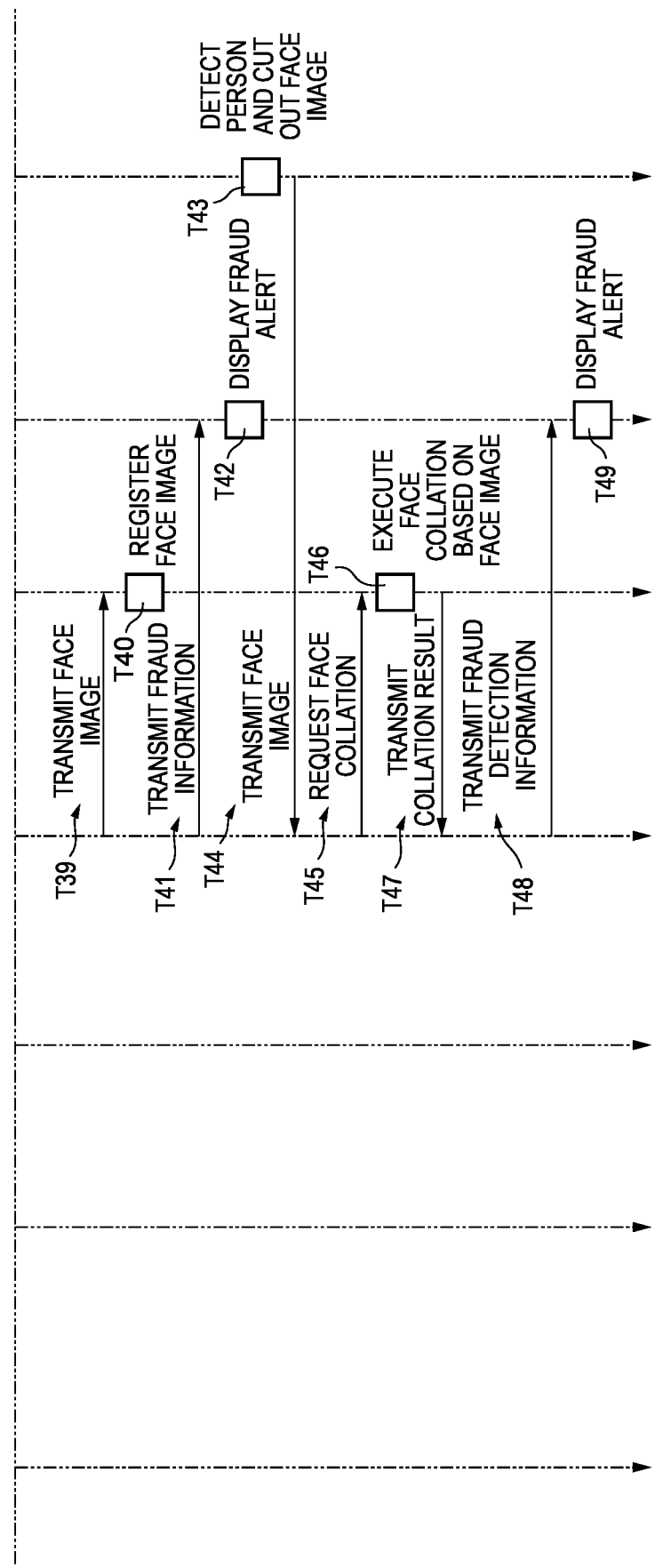

PERSON MONITORING SYSTEM AND PERSON MONITORING METHOD

BACKGROUND OF THE INVENTION

1. Field of the Invention

The present disclosure relates to a person monitoring system and a person monitoring method.

2. Background Art

JP-A-2017-54355 discloses a ticket gate monitoring system including a camera that captures an image of a user who intends to pass through an automatic ticket gate, a reading unit that is installed in the automatic ticket gate and reads information indicating a use condition from a ticket provided with the use condition according to a user's personal attribute, an attribute estimation unit that estimates the user's personal attribute from an image captured by the camera, and a use condition determination unit that determines whether a user who uses the ticket satisfies the use condition based on information indicating the personal attribute estimated by the attribute estimation unit and the information indicating the use condition read by the reading unit.

SUMMARY OF THE INVENTION

According to JP-A-2017-54355, since unauthorized use of the ticket is determined when passing through the automatic ticket gate, the unauthorized use can be suppressed. However, when a person escaped from a scene (for example, a scene where an event such as shoplifting of a commodity or unauthorized passage through a gate when entering has occurred), the person could not be captured unless the person causes a similar event. Furthermore, even when a clerk or security guard captures the person, it is not possible to determine whether the person is the first offender (that is, whether or not he or she is an unauthorized habitual offender), and it is not possible to take prompt action such as reporting or caution.

The present disclosure has been devised in view of the conventional circumstances described above, and an object thereof is to provide a person monitoring system and a person monitoring method capable of efficiently supporting detection of an unauthorized user in a facility.

According to an aspect of the present disclosure, there is provided a person monitoring system including at least one camera and a server, in which the at least one camera and the server are communicably connected to each other, the server is configured to, based on reception of detection information of a predetermined event from a gate that regulates passage when the predetermined event is detected, request a first camera, that captures an image of a capturing area including the gate, for a face image of a person near the gate when the predetermined event occurs, the first camera is configured to capture an image of the person near the gate when the predetermined event occurs and transmit a face image obtained by cutting out a range in which a face of the person is reflected from the captured image of the person to the server, and the server is configured to output alarm information based on the face image and register the face image in a database.

According to another aspect of the present disclosure, there is provided a person monitoring method executed by a person monitoring system including at least one camera, and a server, the at least one camera and the server being communicably connected to each other, the method including requesting a first camera, that captures an image of a capturing area including the gate, for a face image of a person near the gate when the predetermined event occurs, based on reception of detection information of a predetermined event from a gate that regulates passage when the predetermined event is detected, capturing an image of the person near the gate when the predetermined event occurs, transmitting a face image obtained by cutting out a range in which a face of the person is reflected from the captured image of the person to the server, and outputting alarm information based on the face image and registering the face image in a database.

According to the present disclosure, detection of an unauthorized user can be efficiently supported in a facility.

DETAILED DESCRIPTION OF THE EXEMPLARY EMBODIMENT (Background Leading to Contents of Embodiment 1)

JP-A-2017-54355 discloses a ticket gate monitoring system that determines whether or not the use condition is satisfied by using the use condition of the person provided on the ticket and the personal attribute (for example, gender, age, and the like) of the person passing through the automatic ticket gate estimated based on the captured image captured by the camera and suppresses unauthorized use of the ticket. This ticket gate monitoring system can suppress occurrence of the unauthorized use of the ticket by determining the unauthorized use in an automatic ticket gate. However, according to the ticket gate monitoring system described above, when a person has escaped from a scene (for example, a scene where an event such as shoplifting of the commodity or unauthorized passage through gate when a person enters has occurred), he or she could not be captured until reoffending. Furthermore, since the ticket gate monitoring system aims to suppress unauthorized use of the ticket, even when a clerk or security guard seizes the person, it is not possible to determine whether the person is the first offender (that is, whether or not he or she is an unauthorized habitual offender), and is unable to take prompt action such as reporting or caution.

Accordingly, in the following various embodiments, examples of a person monitoring system and a person monitoring method capable of efficiently supporting detection of an unauthorized user in a facility will be described.

Hereinafter, embodiments that specifically disclose the configuration and operation of a person monitoring system and a person monitoring method according to the present disclosure will be described in detail with reference to the accompanying drawings as appropriate. However, an unnecessarily detailed description may be omitted. For example, a detailed description of well-known matters or redundant description of substantially the same configuration may be omitted. This is to prevent the following description from being unnecessarily redundant and to facilitate understanding of those skilled in the art. The accompanying drawings and the following description are provided to enable those skilled in the art to fully understand the present disclosure, and are not intended to limit the subject matter described in the claims.

Embodiment 1

Figure 1:
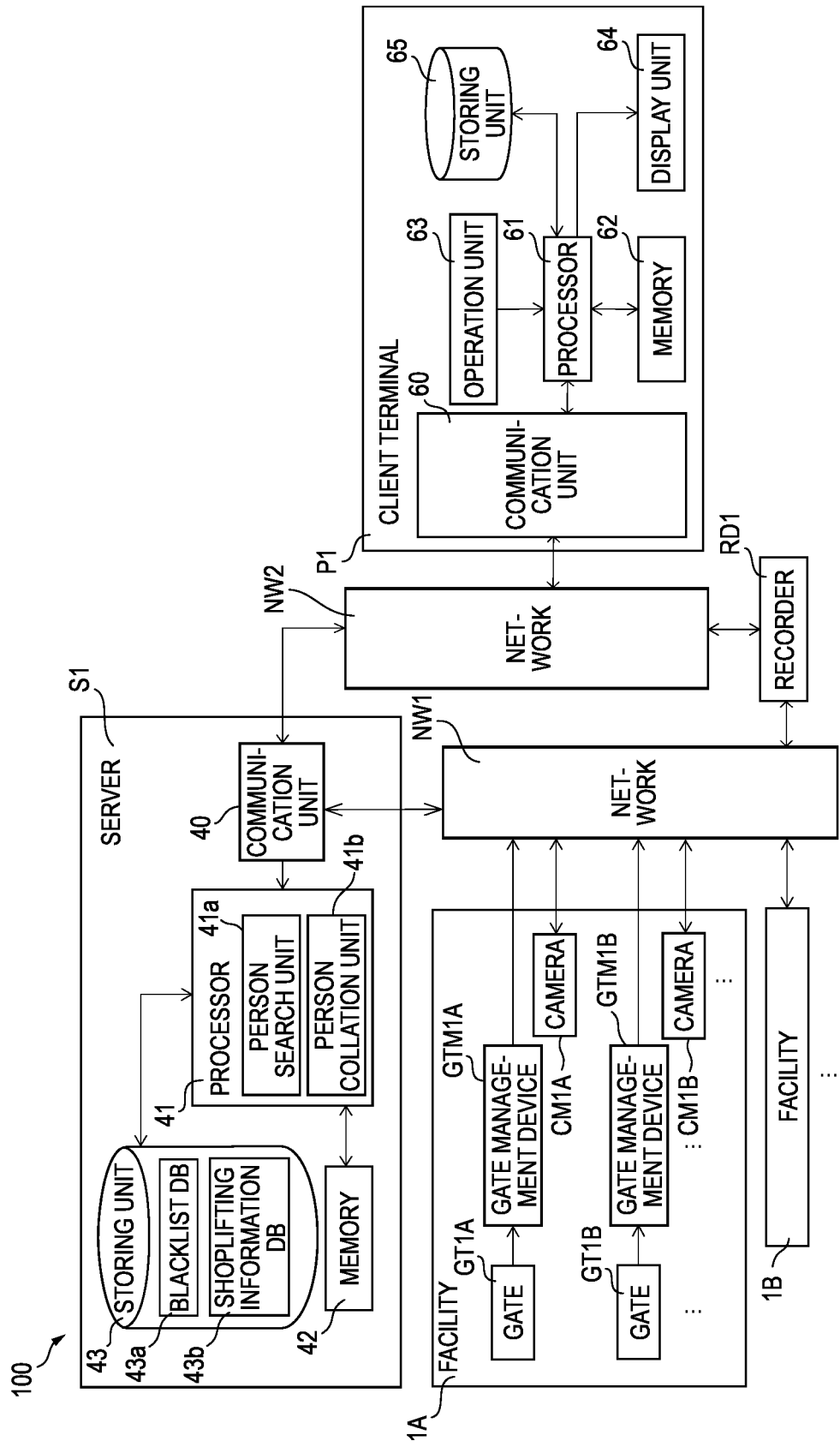
FIG. 1 is a block diagram illustrating an example of an internal configuration of a person monitoring system according to Embodiment 1.

FIG. 1 is a block diagram illustrating an example of an internal configuration of a person monitoring system 100 according to Embodiment 1. The person monitoring system 100 is a system for monitoring a person who commits fraud such as shoplifting, for example, over one facility or a plurality of facilities. The person monitoring system 100 is configured to include each of a plurality of facilities 1A, 1B, . . . including a plurality of gates GT1A, GT1B, . . . , each of a plurality of gate management devices GTM1A, GTM1B, . . . that manages each of the plurality of gates GT1A, GT1B, . . . , and each of a plurality of cameras CM1A, CM1B, . . . that captures an image by including each of the plurality of gates GT1A, GT1B in a capturing area, each of the plurality of networks NW1 and NW2, a server S1, a recorder RD1, and a client terminal P1.

Each of the plurality of facilities 1A, . . . is a facility owned or operated by the same operating company or management company, and is, for example, a store such as a convenience store, a large facility, a complex commercial facility, a store operated by each of a plurality of companies provided in the complex commercial facility, a station, and the like. Each of the plurality of facilities 1A, . . . is configured to include each of the plurality of gates GT1A, . . . , each of the plurality of gate management devices GTM1A, GTM1B, . . . , and each of the plurality of cameras CM1A.

Each of the plurality of gates GT1A, . . . is installed at an entrance and exit of a facility, an entrance and exit of a store, or the like, and detects a tag (for example, an IC tag, a security tag, and the like) provided for commodity for the purpose of preventing the shoplifting crime. Each of the plurality of gates GT1A, . . . may be any of an acousto magnetic type gate, a radio type gate, a magnetic type gate, and a self-sounding type gate. The tag is invalidated by settlement processing at a cash register.

Each of the plurality of gates GT1A, . . . outputs information indicating that a tag provided in the commodity and not invalidated is detected to each of the plurality of gate management devices GTM1A, . . . . The tag may be, for example, a tag such as an IC tag that cannot store information about a commodity, or a tag such as a security tag that can store information capable of identifying an individual commodity. When each tag stores information capable of identifying an individual commodity, each of the plurality of gates GT1A, . . . may detect and output the information to each of the plurality of gate management devices GTM1A, . . . .

Each of the plurality of gate management devices GTM1A, . . . is communicably connected to the server S1 via the network NW1. Each of the plurality of gate management devices GTM1A, . . . transmits information, such as the detected time and place, and information on the commodity stored in the tag, based on information input from each of the plurality of gates GT1A, . . . , to the server S1 via the network NW1 as detection information indicating occurrence of shoplifting.

Each of the plurality of cameras CM1A, . . . is communicably connected to the server S1 via the network NW1. Each of the plurality of cameras CM1A, . . . is installed near each of the plurality of gates GT1A, . . . and captures an image of a capturing area including at least one of the plurality of gates GT1A, . . . . Each of the plurality of cameras CM1A, . . . captures an image of a person passing through each of the plurality of gates GT1A, . . . . Each of the plurality of cameras CM1A, . . . transmits a face image, which is obtained by cutting out a range in which the face of the person is captured from among the persons whose images are captured in the captured image, to the server S1 via the network NW1.

Each of the plurality of cameras CM1A, . . . may capture an image each of the plurality of gates with one camera. Furthermore, each of the plurality of cameras CM1A, . . . may include not only each of the plurality of cameras that capture an image of each of the plurality of gates GT1A, . . . , but also each of the plurality of cameras that capture images of other places. Each of the plurality of cameras that capture the images of other places may transmit the captured image itself without cutting out the face image of the person to the server S1 via the network NW1. With this configuration, even if the facility is a complex commercial facility equipped with a plurality of entrances and exits, the person monitoring system 100 can track the person based on captured images captured by each of a plurality of other cameras even when a shoplifted person runs away. Even when a person escapes from a shoplifting scene or facility, the person monitoring system 100 can notify an administrator of the person as a habitual offender (that is, not a first offender), for example, when shoplifting is performed again later and can also notify the administrator when shoplifting is performed in another store or another facility.

The number of the facilities illustrated in FIG. 1 may be one. Although the facility 1A in FIG. 1 is configured to include each of the plurality of gates GT1A, GT1B, . . . , each of the plurality of gate management devices GTM1A, GTM1B, . . . , and each of the plurality of cameras CM1A, CM1B, . . . , the number of gates, the number of gate management devices, and the number of cameras may be one each, and the number of cameras may not match the number of gates and gate management devices, in the facility 1A in FIG. 1.

Each of the plurality of networks NW1, NW2, . . . is a wired network. The network NW1 is communicably connected to each of the plurality of facilities 1A, . . . and the server S1. The network NW2 is communicably connected to the server S1 and the client terminal P1.

The server S1 determines whether the person who has performed shoplifting is a first offender or a habitual offender and outputs alarm information to the client terminal P1. The server S1 includes a communication unit 40, a processor 41, a memory 42, and a storing unit 43.

The communication unit 40 is communicably connected to each of the plurality of gate management devices GTM1A, . . . provided in each of the plurality of facilities 1A, . . . and each of the plurality of cameras CM1A, . . . via the network NW1. The communication unit 40 receives detection information from each of the plurality of gate management devices GTM1A, . . . and receives a face image or a captured image from each of the plurality of cameras CM1A, . . . . The communication unit 40 is communicably connected to the client terminal P1 via the network NW2. The communication unit 40 transmits alarm information generated by the server S1 to the client terminal P1.

The processor 41 is configured using, for example, a central processing unit (CPU) or a field programmable gate array (FPGA), and performs various processes and controls in cooperation with the memory 42. Specifically, the processor 41 refers to a program and data stored in the memory 42 and executes the program to implement the function of each unit. The units are a person search unit 41a and a person collation unit 41b. The functions of the units are, for example, a function of searching for and comparing each of the plurality of face images stored in a blacklist DB 43a with the face image of the person received from each of the plurality of cameras CM1A, . . . , and a function of searching for and extracting past shoplifting information of a person from a shoplifting information DB 43b based on the face image of the person.

The processor 41 stores the detection information received from each of the plurality of gate management devices GTM1A, . . . in the shoplifting information DB 43b, and stores the face image of the person received from each of the plurality of cameras CM1A, . . . and information of the camera that has captured the person in the blacklist DB 43a. The detection information, the face image of the person, and the information of the camera are stored in the blacklist DB 43a and the shoplifting information DB 43b in association with each other.

The person search unit 41a receives the detection information indicating that shoplifting has occurred from each of the plurality of gate management devices GTM1A, . . . . The person search unit 41a extracts feature points from a face image of a person received from a camera that captures a gate that detects shoplifting based on the detection information, and searches for a face image or a captured image of a person having similar feature points from among face images or captured images of a plurality of persons stored in the blacklist DB 43a. The person search unit 41a outputs the search result to the person collation unit 41b.

The person collation unit 41b collates the face image of the person who has performed shoplifting with the search result based on the search result input from the person search unit 41a. As a result of the collation, when the face image of the person who has performed shoplifting is not found in the captured image extracted as the search result, the person collation unit 41b determines that the person is a first offender, and generates alarm information (see FIG. 5A) using the face image and alert information indicating that shoplifting has occurred. As a result of the collation, when the face image of the person who has performed shoplifting is found in the captured image extracted as the search result, the person collation unit 41b determines that the person is a second or later habitual offender, and generates alarm information (see FIG. 5B) using the face image and the search result and alert information indicating that shoplifting has occurred. The server S1 transmits the generated alert information and alarm information to the client terminal P1 via the network NW2. With this configuration, the client can determine at a glance whether or not the person who has performed shoplifting is the first offender (that is, whether or not he or she is a habitual offender).

The memory 42 includes, for example, a random access memory (RAM) as a work memory used when executing each processing of the processor 41 and a read only memory (ROM) for storing a program and data that prescribe the operation of the processor 41. Data or information generated or acquired by the processor 41 is temporarily stored in the RAM. A program that prescribes the operation of the processor 41 is written in the ROM.

The storing unit 43 is configured using a hard disk drive (HDD) or a solid state drive (SSD), for example. In the storing unit 43, the detection information received from each of the plurality of gate management devices GTM1A, . . . and information (for example, the installation place of the camera, the image-capturing time when the image of the person is captured, and the like) about the camera that has captured the person who has performed shoplifting are stored in the shoplifting information DB 43b. The storing unit 43, stores the captured image and face image of the person (criminal) in the blacklist DB 43a. The storing unit 43 stores the information stored in the blacklist DB 43a and the shoplifting information DB 43b in association with each other. With this configuration, the person monitoring system 100 can extract the history of the past shoplifting information of a person, and determine whether or not the person is the first offender (that is, whether or not he or she is a habitual offender) based on such information.

The recorder RD1 is configured using, for example, the hard disk (HDD) or the solid state drive (SSD). The recorder RD1 is communicably connected to each of the plurality of cameras CM1A, . . . via the network NW1, and communicably connected to the client terminal P1 via the network NW2. The recorder RD1 stores captured images (captured images) received from each of the plurality of cameras CM1A, . . . . The recorder RD1 transmits a designated captured image among the plurality of stored captured images to the client terminal P1 based on an operation of the client.

The client terminal P1 is, for example, a personal computer (PC) used by a client (that is, an administrator) that manages the plurality of facilities 1A, . . . . The client terminal P1 is communicably connected to the recorder RD1 via the network NW1, and communicably connected to the server S1 via the network NW2. The client terminal P1 is configured to include a communication unit 60, a processor 61, a memory 62, an operation unit 63, a display unit 64, and a storing unit 65.

The client terminal P1 is not limited to the PC described above, and may be a computer having a communication function such as a smartphone, a tablet terminal, or a personal digital assistant (PDA). When the client terminal P1 has a wireless communication function, the client terminal P1 may communicate with the network NW2 via a further wireless network. The wireless network in this case is, for example, a wireless local area network (LAN), a wireless wide area network (WAN), a fourth-generation (4G) mobile communication system, long term evolution (LTE), LTE-Advanced, a fifth-generation (5G) mobile communication system, Wi-Fi (registered trademark), wireless gigabit (WiGig), or the like. The number of client terminals P1 is not limited to one, and may be plural.

The communication unit 60 is communicably connected to the server S1 and the recorder RD1 via the network NW2. The communication unit 60 receives alarm information from the server S1.

The processor 61 is configured using, for example, a CPU or an FPGA, and performs various processes and controls in cooperation with the memory 62. Specifically, the processor 61 refers to a program and data stored in the memory 62 and executes the program to implement the function of each unit. The function of each unit is, for example, a function of generating a control signal requesting a captured image based on an input operation of a client, a function of displaying alarm information received from the server S1 on the display unit 64, and the like.

The processor 61 executes an alert notification to the client based on the alert information received from the server S1. A method of alert notification may be a notification made by being displayed on the display unit 64, or made by turning on a warning light illustrated in FIGS. 5A and 5B. The method of alert notification may be a notification made by a voice output from a speaker (not illustrated). The processor 61 causes the display unit 64 to display the alarm information received from the server S1. With this configuration, the person monitoring system 100 can visually or audibly notify the client of the occurrence of shoplifting. Furthermore, the client can immediately determine whether or not the person who has performed shoplifting is the first offender (that is, whether or not he or she is a habitual offender) based on the alarm information displayed on the display unit 64.

Furthermore, the processor 61 executes a search for information stored in the storing unit 43 in the server S1 and acquisition of the search result, or a search for information of the captured image (captured video image) stored in the recorder RD1 and acquisition of the search result, based on input of a search key by the client received from the operation unit 63. The acquired information is displayed on the display unit 64 and stored in the storing unit 65.

The memory 62 includes, for example, a RAM as a work memory used when executing each processing of the processor 61, and a ROM for storing a program and data prescribing the operation of the processor 61. Data or information generated or acquired by the processor 61 is temporarily stored in the RAM. A program that prescribes the operation of the processor 61 is written in the ROM.

The storing unit 65 is configured using, for example, a hard disk drive (HDD) or a solid state drive (SSD). The storing unit 65 stores the alert information and the alarm information received from the server S1. The storing unit 65 stores a search result received from the server S1 or a captured image received from the recorder RD1 based on an input operation of the client. The storing unit 65 may store history information about the input operation of the client.

The operation unit 63 is a user interface (U1) that detects an input operation of the client, and is configured using a mouse, a keyboard, a touch panel, or the like. The operation unit 63 outputs a signal based on the input operation of the client to the processor 61. The operation unit 63 receives, for example, an input of a search key, such as date, time, place (for example, facility information), and information on the camera, of a captured image (captured video image) of a predetermined camera that the client wants to check.

The display unit 64 is configured using a display such as a liquid crystal display (LCD) or an organic electroluminescence (EL), and displays the alarm information received from the server S1 and data of the captured image (captured video image) received from the recorder RD1. The display unit 64 may be configured using, for example, a speaker (not illustrated) and outputs an alert notification by a voice.

The storing unit 65 is configured using, for example, a hard disk drive (HDD) or a solid state drive (SSD). The storing unit 65 stores the alert notification and the alarm information received from the server S1, the captured image (captured video image) received from the recorder RD1, and the like.

Figure 2:
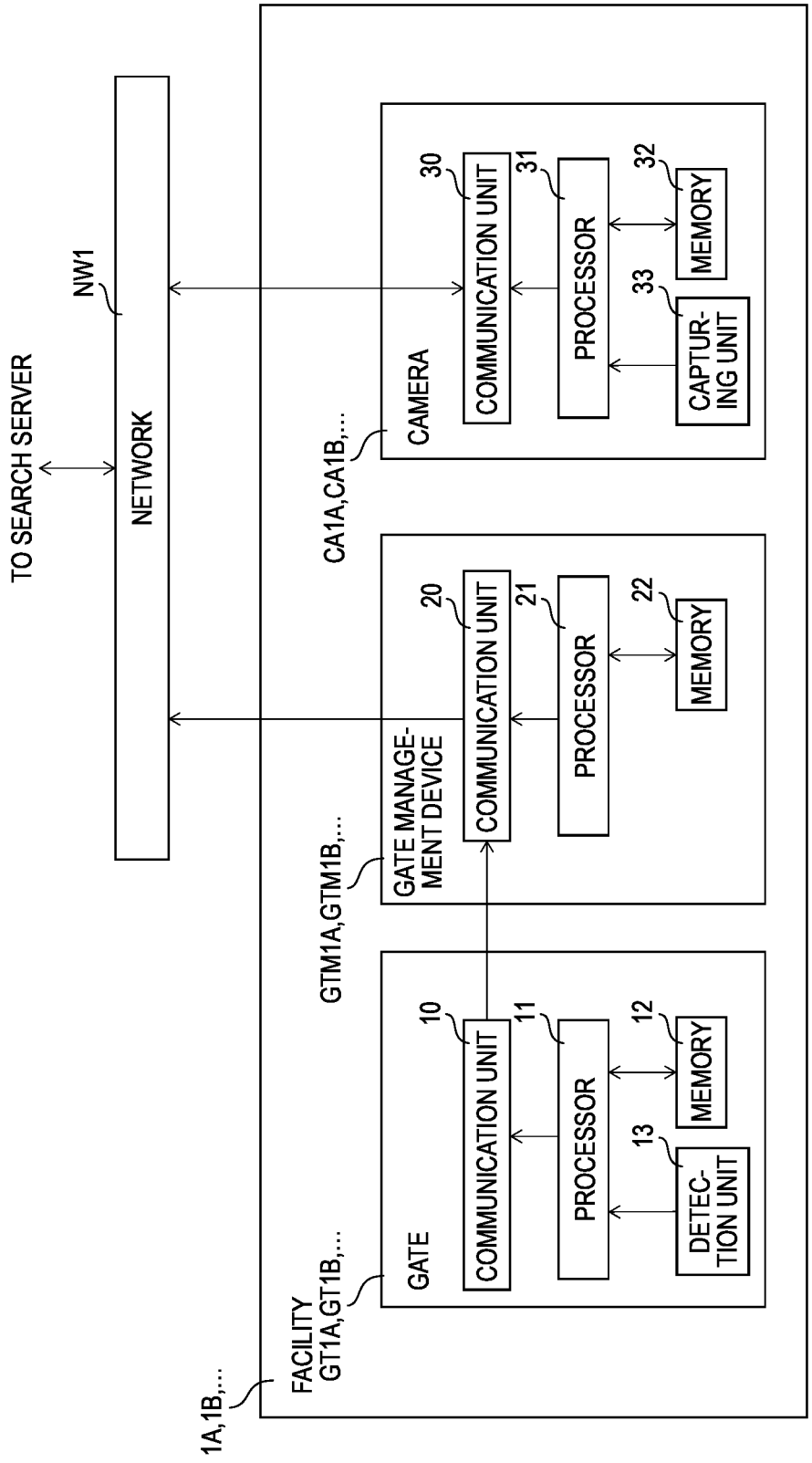
FIG. 2 is a block diagram illustrating an example of an internal configuration of the person monitoring system according to Embodiment 1 in a facility.

Hereinafter, an internal configuration of each of the plurality of facilities 1A, 1B, . . . will be described with reference to FIG. 2. FIG. 2 is a block diagram illustrating an example of the internal configuration of the person monitoring system 100 according to Embodiment 1 in the facility. The internal configuration of each of the plurality of facilities 1A, 1B, . . . has the same configuration, and FIG. 2 illustrates an example of the internal configuration of the facility 1A. The internal configuration of each of the plurality of facilities 1A, 1B, . . . may differ in the number of various configurations (for example, gates, gate management devices, and cameras). Similarly, in the following description of FIG. 2, for each of the plurality of gates GT1A, GT1B, . . . , each of the plurality of gate management devices GTM1A, GTM1B, . . . , and each of the plurality of cameras CM1A, CM1B, . . . , an example of the internal configuration of the gate GT1A, the gate management device GTM1A, and the camera CM1A will be described.

The gate GT1A detects a tag (that is, a commodity that has not been settled) that is provided on a commodity and that has not been invalidated. The gate GT1A is configured to include a communication unit 10, a processor 11, a memory 12, and a detection unit 13.

The communication unit 10 is communicably connected to the gate management device GTM1A. The communication unit 10 transmits detection of the tag and information on the commodity detected by the detection unit 13 to the gate management device GTM1A. The information on the commodity is not essential information.

The processor 11 is configured using, for example, a CPU or an FPGA, and performs various processes and controls in cooperation with the memory 12. Specifically, the processor 11 refers to a program and data stored in the memory 12 and executes the program to implement the function of each unit. The function of each unit is, for example, a function of detecting a tag, a function of detecting information on a commodity stored in the detected tag, and the like.

The memory 12 includes, for example, a RAM as a work memory used when executing each processing of the processor 11, and a ROM for storing a program and data prescribing the operation of the processor 11. Data or information generated or acquired by the processor 11 is temporarily stored in the RAM. A program that prescribes the operation of the processor 11 is written in the ROM.

The detection unit 13 detects, among tags passing through the gate GT1A, a tag that has not been invalidated and information on the commodity stored in the tag. The detection unit 13 outputs a signal indicating that the tag has been detected to the gate management device GTM1A.

The gate management device GTM1A is communicably connected to the gate GT1A. The gate management device GTM1A transmits detection information (for example, date, time, and gate identification number) indicating occurrence of shoplifting to the server S1 via the network NW1, based on the signal received from the gate GT1A with the server S1. The gate management device GTM1A includes a communication unit 20, a processor 21, and a memory 22.

The communication unit 20 is communicably connected to the gate GT1A. The communication unit 20 is communicably connected to the server S1 via the network NW1. The communication unit 20 transmits the detection information to the server S1.

The processor 21 is configured using, for example, a CPU or an FPGA, and performs various processes and controls in cooperation with the memory 22. Specifically, the processor 21 refers to a program and data stored in the memory 22 and executes the program to implement the function of each unit. The function of each unit is, for example, a function of generating detection information (for example, date, time, and gate identification number) indicating occurrence of shoplifting.

The memory 22 includes, for example, a RAM as a work memory used when executing each processing of the processor 21 and a ROM for storing a program and data prescribing the operation of the processor 21. Data or information generated or acquired by the processor 21 is temporarily stored in the RAM. A program that prescribes the operation of the processor 21 is written in the ROM. Further, the memory 22 may store the generated detection information.

The camera CM1A is communicably connected to the server S1 and the recorder RD1 via the network NW1. The camera CM is installed so as to be able to capture an image of an any place in the gate GT1A or the facility 1A, and transmits a face image or a captured image (captured video image) of the person who has performed the shoplifting. The camera CM1A includes a communication unit 30, a processor 31, a memory 32, and a capturing unit 33.

The communication unit 30 is communicably connected to the server S1 and the recorder RD1 via the network NW1. The communication unit 20 transmits the face image or the captured image (captured video image) of the person who has performed the shoplifting to the server S1 and the recorder RD1.

The processor 31 is composed of, for example, a CPU or an FPGA, and performs various processes and controls in cooperation with the memory 32. Specifically, the processor 31 refers to a program and data stored in the memory 32 and executes the program to implement the function of each unit. The function of each unit is, for example, a function of cutting out a face image of a person from a captured image.

The memory 32 includes, for example, a RAM as a work memory used when executing each processing of the processor 31 and a ROM for storing a program and data prescribing the operation of the processor 31. Data or information generated or acquired by the processor 31 is temporarily stored in the RAM. A program that prescribes the operation of the processor 31 is written in the ROM.

The capturing unit 33 includes at least a lens 18 and an image sensor (not illustrated). The image sensor is, for example, a solid-state capturing device a charge-coupled device (CCD) or a complementary metal oxide semiconductor (CMOS), and converts an optical image formed on a capturing surface into an electric signal. While the power of the camera CM1A is on, the capturing unit 33 constantly transmits a captured image (captured video image) acquired by capturing to the recorder RD1. While the power of the camera CM1A is on, the capturing unit 33 cuts out a captured image obtained by capturing an image or a face image of a person reflected in the captured image and transmits the cut out image to the server S1. When the camera CM1A captures an image other than the gate GT1A, the capturing unit 33 does not need to have a function of cutting out the face image of the person.

Figure 3:
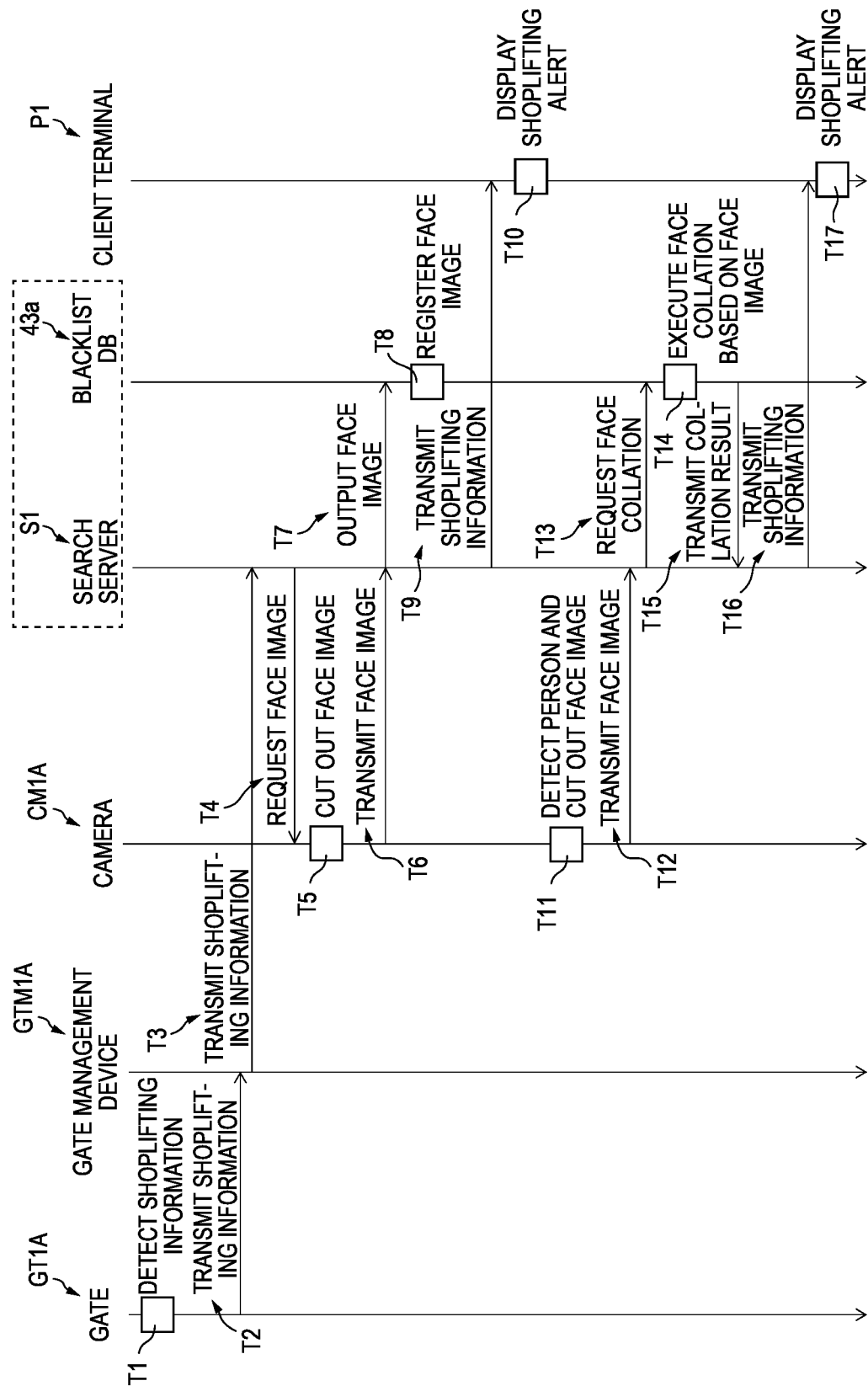
FIG. 3 is a sequence diagram illustrating an example of an operation procedure of the person monitoring system according to Embodiment 1.

FIG. 3 is a sequence diagram illustrating an example of an operation procedure of the person monitoring system 100 according to Embodiment 1. In the description of FIG. 3, the operation procedure of each of the gate GT1A, the gate management device GTM1A, and the camera CM in the facility 1A will be described.

The gate GT1A detects a tag (that is, shoplifting information) that has not been invalidated from a person passing through the gate GT1A (T1).

When information such as a commodity is stored in the tag that has not been invalidated, the gate GT1A extracts information stored in the tag and generates shoplifting information indicating the occurrence of shoplifting. The gate GT1A transmits the generated shoplifting information to the gate management device GTM1A (T2).

The gate management device GTM1A generates shoplifting information (detection information) in which the date, time, place or information (for example, an identification number assigned to each gate) on the gate GT1A when shoplifting is detected to the received shoplifting date, time, place, or information on the gate GT1A, and transmits the shoplifting information to the server S1 via the network NW1 (T3).

The server S1 transmits a control signal requesting a face image of a person who has performed shoplifting to the camera CM1A based on shoplifting information (detection information) received from the gate management device GTM1 (T4).

The camera CM1A executes processing of cutting out a face image of a person from a captured image obtained by capturing an image of the gate GT1A for which shoplifting is detected, based on the control signal received from the server S1 (T5).

The camera CM transmits the cut-out face image to the server S1 via the network NW1 (T6).

The server S1 outputs the received face image to the blacklist DB 43a which stores the face image or captured image of each of a plurality of persons who have shoplifted in the past (T7).

In the blacklist DB 43a, the input face image is registered (stored) in association with the shoplifting information (detection information) (T8).

The server S1 collates the face image or captured image of each of a plurality of persons who have shoplifted in the past, which is stored in the blacklist DB 43a, with the face image received from the camera CM1A. When the face image or the captured image of the matching person as the received face image is not stored based on the collation result, the server S1 generates an alert notification indicating that shoplifting has occurred and alarm information indicating that the person who has performed shoplifting is the first offender. The server S1 transmits the alert notification and the alarm information (that is, shoplifting information) to the client terminal P1 via the network NW2 (T9).

The server S1 causes the camera CM1A to execute control to cut out and transmit a face image of a person when the person who has executed shoplifting is captured. Such control is executed not only for the camera CM but also for a camera that captures an image of another gate or a camera that captures a place other than the gate.

The client terminal P1 performs an alert notification based on the received shoplifting information and displays the alarm information (T10).

When camera CM1A detects that the image of the person who has previously performed shoplifting has been captured again in the captured image, the camera CM1A executes processing of cutting out the face image of the person (T11). The detection of a person may be executed regardless of whether or not the person has performed shoplifting again.

The camera CM transmits the cut out face image of the person to the server S1 via the network NW1 (T12).

The server S1 requests a face collation for the received face image (T13). Specifically, the person search unit 41a searches for the matching person from among the face images or captured images of a plurality of persons stored in the blacklist DB 43a of the storing unit 43, based on the received face image.

The server S1 executes the face collation based on the received face image and the face image or captured image obtained by the search (T14). Specifically, the person collation unit 41b collates and determines whether or not the received face image and the search result by the person search unit 41a are the matching person, based on the received face image and the search result by the person search unit 41a.

The server S1 outputs, as a collation result, a face image or captured image of the matching person as the person having the face image among the face images or captured images of the plurality of persons stored in the blacklist DB 43a (T15).

The server S1 determines that the person of the received face image is not the first offender (that is, a habitual offender) based on the collation result, and generates shoplifting information including an alert notification indicating that shoplifting has occurred and alarm information indicating that the person who has performed shoplifting is a habitual offender. The server S1 transmits the generated shoplifting information to the client terminal P1 via the network NW2 (T16).

The client terminal P1 performs an alert notification of shoplifting occurrence based on the received shoplifting information, and displays alarm information (T17).

Thereafter, the person monitoring system 100 according to Embodiment 1 can repeatedly execute the detection of the person stored in the blacklist DB 43a, and causes the client terminal P1 to display the information of the detected person, and efficiently support the detection of an unauthorized user in the facility. With this configuration, the client can efficiently monitor a habitual shoplifting offender.

Figure 4:
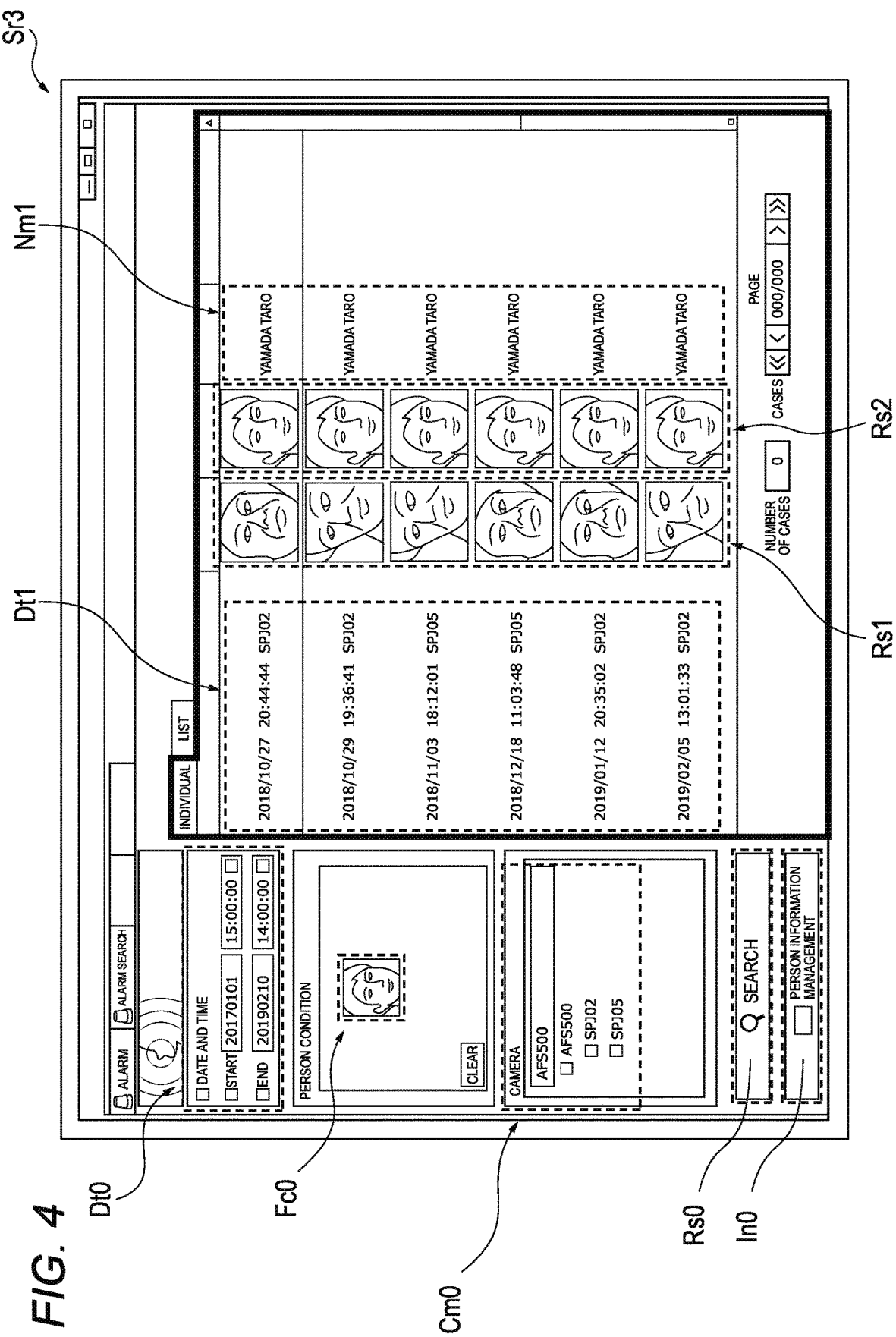
FIG. 4 is a diagram illustrating an example of display of a search result screen.

FIG. 4 is a diagram illustrating an example of display of the search result screen Sr3. The search result illustrated in FIG. 4 illustrates an example of a search result screen Sr3 in which a face image stored in the blacklist DB 43a of the server S1 is searched based on a search key input by a client.

The search result screen Sr3 is displayed on the display unit 64. In a search condition illustrated on the left side of the search result screen Sr3, conditions are set for each item by an input operation of the client. In an item Dt0, a date and time to be searched for can be set for a predetermined period. An item Fc0 can be set by dragging or uploading a face image to be searched for. In an item Cm0, identification information given to each camera to be searched for can be set. Although the identification information given to each camera illustrated in FIG. 4 is selectable as a check box, the present invention is not limited to this, and the identification information may be collectively selectable for each facility or floor, for example. When a condition is set by the client and a search button Rs0 is selected, the client terminal P1 transmits the search condition to the server S1.

Further, a search result is displayed on the right side of the search result screen Sr3. In the date and time Dt1, the date and time when the face image is captured by the camera is displayed. The date and time Dt1 may be displayed together with identification information for each camera. As Rs1 of each of the plurality of face images, each of the face images captured by the predetermined camera on the date and time Dt1 is displayed. Rs2 of each of the plurality of face images indicates a collation result of each of the plurality of face images captured at the date and time Dt1 with respect to Rs1. A name Nm1 is the name of the person stored in the blacklist DB 43a or the shoplifting information DB 43b and displayed on each of the plurality of face images Rs2. The name Nm1 is displayed only when specified.

A person management information button In0 is a button for searching and managing history information (for example, history information of shoplifting performed by the person so far) on a person who has shoplifted. With this configuration, the client may manage a caution person who has performed a lot of shoplifting or a caution person who has incurred a large amount of damage caused by shoplifting, among the plurality of persons.

The arrangement and display method of each of the plurality of search items and each of the plurality of search results are not limited those described above. For example, each of the plurality of search items and each of the plurality of search results may be displayed separately for each tab.

Figure 5A:
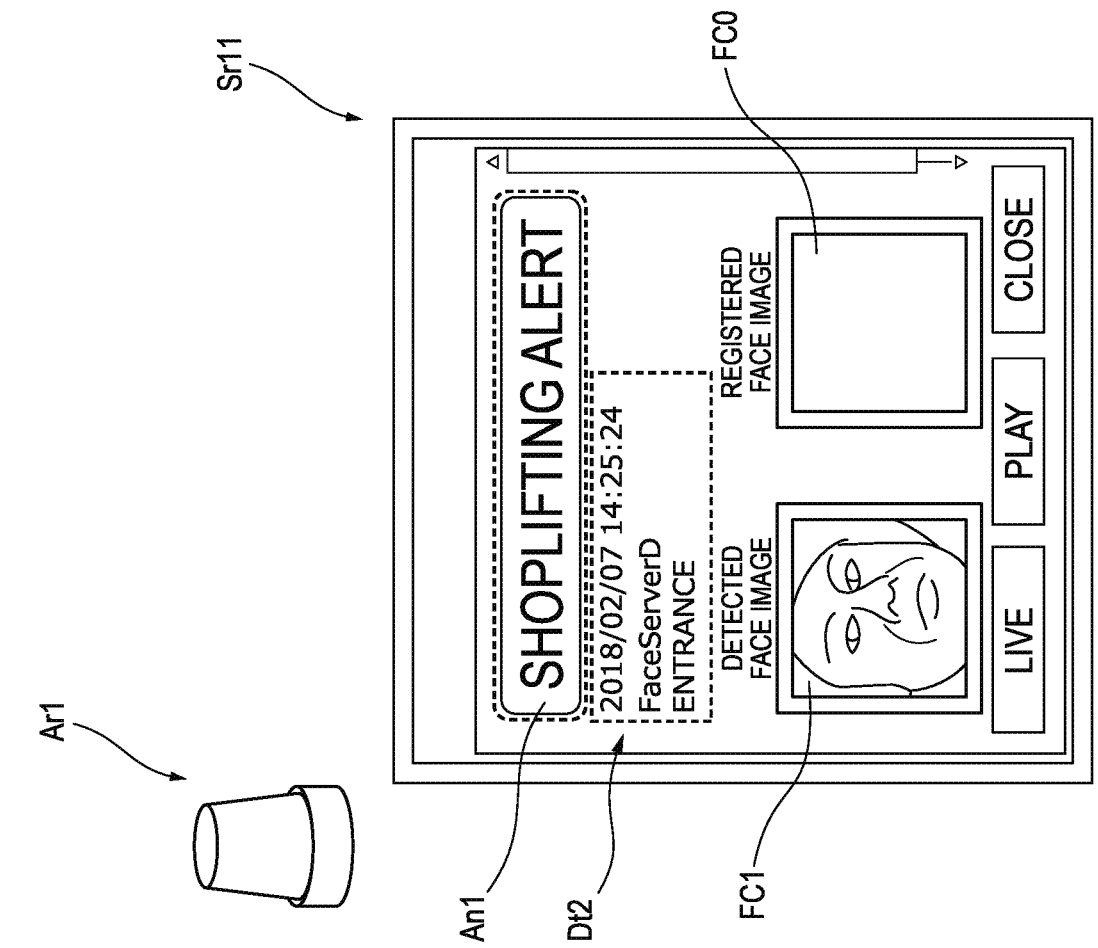
FIG. 5A is a diagram illustrating an example of alarm information (first offender).
Figure 5B:
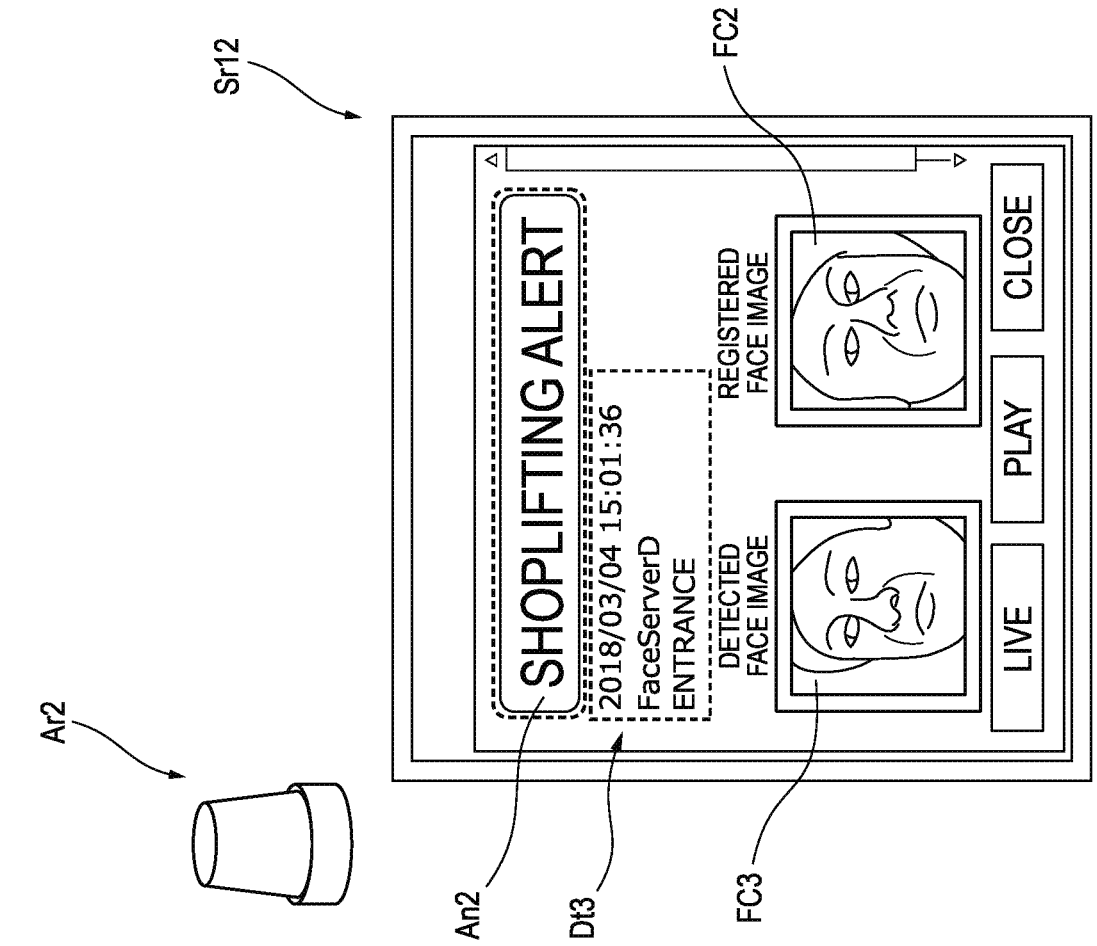
FIG. 5B is a diagram illustrating an example of alarm information (repeat offender).

The alert notification and the alarm information generated by the server S1 will be described with reference to FIGS. 5A and 5B. FIG. 5A is a diagram illustrating an example of alarm information (first offender). FIG. 5B is a diagram illustrating an example of alarm information (repeat offender). Each of the alarm information is displayed on the display unit 64 of the client terminal P1.

Each of the plurality of warning lights Ar1 and Ar2 is installed in the same room where the client terminal P1 is installed, and is turned on based on the reception of the alert notification. The number of each of the plurality of warning lights Ar1 and Ar2 may be one or plural. Each of the plurality of warning lights Ar1 and Ar2 may have a different color to be lit based on whether or not the alert notification is a notification indicating the first offender. With this configuration, the client can visually determine whether or not shoplifting has occurred and whether or not the person is a habitual shoplifting offender, based on the colors of the plurality of warning lights Ar1 and Ar2.

An alarm information screen Sr11 is displayed when shoplifting by the person is the first offense. In a case content An1, the content of the occurred event is displayed, and for example, "shoplifting alert" is displayed in the case of shoplifting, and "unauthorized entrance alert" is displayed in the case of unauthorized use of an entrance ticket or a ticket. In event information Dt2, the date and time when shoplifting is detected, the identification number and place of the gate where shoplifting is detected, and the like are displayed. The event information Dt2 is not limited thereto, and may be identification information and a place of a camera that has captured the image of the person who has performed the shoplifting. An image display area FC1 is a face image of a person captured by a camera when shoplifting is detected. In an image display area FC0, a face image which is the matching person who has performed the shoplifting and registered (stored) in the blacklist DB 43a is displayed. Nothing is displayed in the image display area FC0 when shoplifting by that person is the first offense.

An alarm information screen Sr12 is displayed when shoplifting by the person is the first offense. In a case content An2, the content of the occurred event is displayed, and for example, "shoplifting alert" is displayed in the case of shoplifting, and "unauthorized entrance alert" is displayed in the case of unauthorized use of an entrance ticket or a ticket. In event information Dt3, the date and time when shoplifting is detected, the identification number and place of the gate where shoplifting is detected, and the like are displayed. The event information Dt3 is not limited thereto, and may be identification information and a place of a camera that has captured the image of the person who has performed the shoplifting. An image display area FC3 is a face image of a person captured by a camera when shoplifting is detected. In an image display area FC2, a face image which is the matching person who has performed the shoplifting and registered (stored) in the blacklist DB 43a is displayed.

Figure 6:
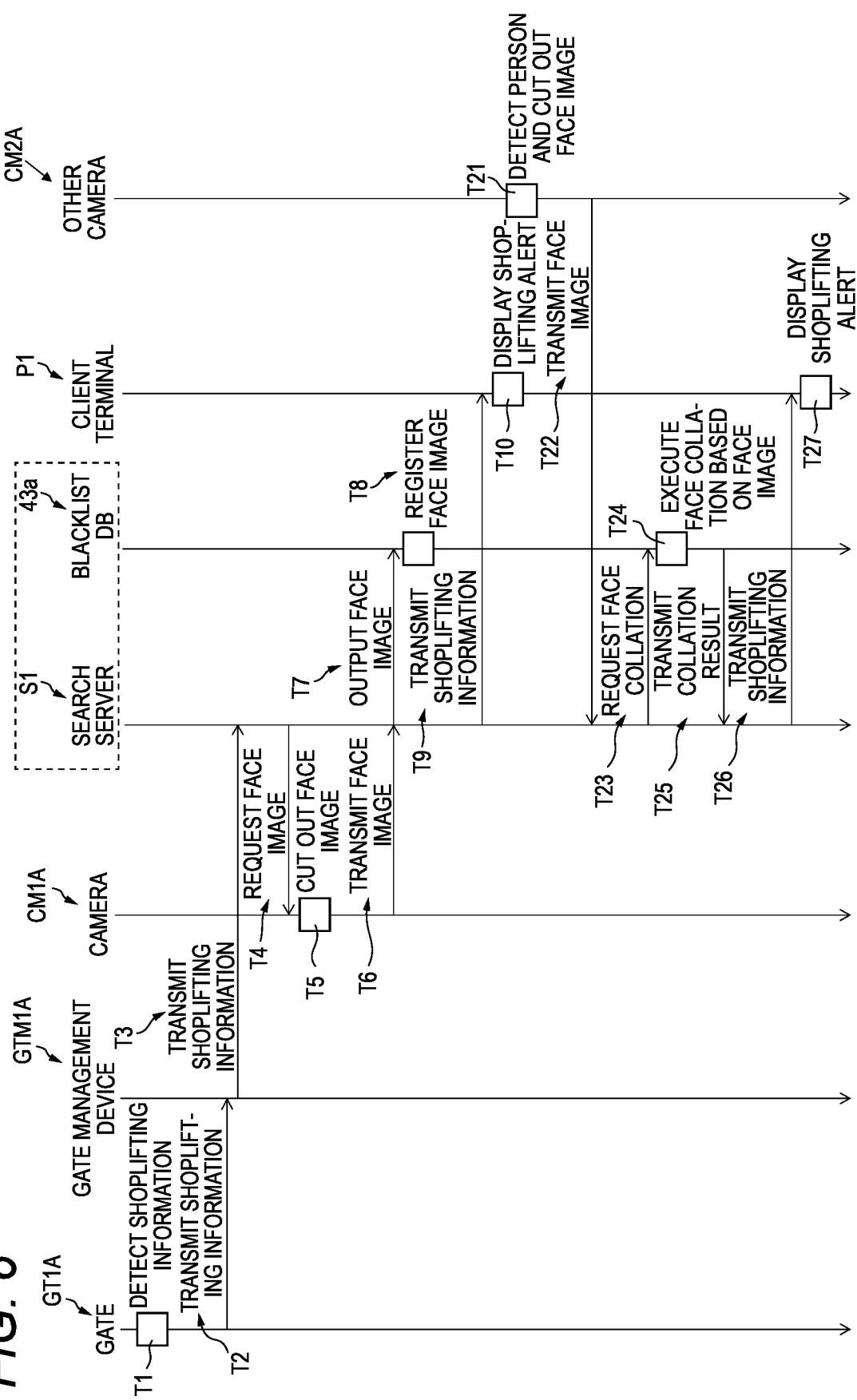
FIG. 6 is a sequence diagram illustrating an example of an operation procedure of the person monitoring system according to Embodiment 1.

FIG. 6 is a sequence diagram illustrating an example of an operation procedure of the person monitoring system 100 according to Embodiment 1. In the description of FIG. 6, the operation procedures of each of the gate GT1A, the gate management device GTM1A, the camera CM1A, and the camera CM2A in the facility 1A will be described. Steps T1 to T10 in FIG. 6 are the same steps as those in the example of the operation procedure of the person monitoring system 100 illustrated in FIG. 3. Therefore, the description is omitted by using the same numbers. Although the description is made in such a way that the other camera CM2A illustrated in FIG. 6 is an example of the operation procedure of the person monitoring system 100 as a camera installed in another facility different from the camera CM1A, the other camera CM2A may be installed in the same facility as the camera CM1A.

The other camera CM2A is a camera installed at a gate or an arbitrary position of another facility different from the camera CM1A, and detects the person who has performed shoplifting detected in processing of step T1 from the captured image and executes face image cutout processing (T21). In processing of step T21, the image of the person may be captured and detected by another camera CM2A not only when the person, who has perform shoplifting, has performed shoplifting again, for example, when the person enters another facility or while moving through another facility.

The other camera CM2A transmits the face image of the person who has performed shoplifting to the server S1 via the network NW1 (T22).

The server S1 requests a face collation for the received face image (T23). Specifically, the person search unit 41a searches for the matching person from among the face images or captured images of a plurality of persons stored in the blacklist DB 43a of the storing unit 43, based on the received face image.

The server S1 executes the face collation based on the received face image and the face image or captured image obtained by the search (T24). Specifically, the person collation unit 41b collates and determines whether or not the received face image and the search result by the person search unit 41a are the matching person, based on the received face image and the search result by the person search unit 41a.

The server S1 outputs, as a collation result, a face image or captured image of the matching person as the person having the face image among the face images or captured images of the plurality of persons stored in the blacklist DB 43a (T25).

The server S1 determines that the person of the received face image is not the first offender (that is, a habitual criminal offender) based on the collation result, and generates shoplifting information including an alert notification indicating that shoplifting has occurred and alarm information indicating that the person who has performed shoplifting is a habitual offender. The server S1 transmits the generated shoplifting information to the client terminal P1 via the network NW2 (T26).

The client terminal P1 performs an alert notification of shoplifting occurrence based on the received shoplifting information, and displays alarm information (T27).

Thereafter, the person monitoring system 100 according to Embodiment 1 can repeatedly execute the detection of the person stored in the blacklist DB 43a, and causes the client terminal P1 to display the information of the detected person, and efficiently support the detection of an unauthorized user in the facility. With this configuration, the client can efficiently monitor a habitual shoplifting offender.

In the person monitoring system 100 according to Embodiment 1, at least one camera CM1A and the server S1 are communicably connected to each other, the server S1, based on reception of detection information of a predetermined event (for example, shoplifting, unauthorized use of a ticket, an entrance ticket, or the like) from a gate GT1A that regulates passage when the predetermined event is detected, requests a first camera CM1A, that captures an image of a capturing area including the gate GT1A, for a face image of a person near the gate GT1A when the predetermined event occurs. The first camera CM captures an image of the person near the gate GT1A when the predetermined event occurs, and transmits a face image obtained by cutting out a range in which the face of the person is reflected from the captured image of the person to the server S1. The server S1 outputs alarm information based on the face image and registers the face image in the blacklist DB 43a as an example of a database.

With this configuration, the person monitoring system 100 according to Embodiment 1 can detect a predetermined event, receive a face image of a person near the gate GT1A when the predetermined event occurs, based on the reception of the detection information of the predetermined event from the gate GT1A that regulates passage, output alarm information based on the face image, and register the face image in the blacklist DB 43a. Accordingly, the person monitoring system 100 can efficiently support detection of the unauthorized user in the facility.

The server S1 in the person monitoring system 100 according to Embodiment 1 collates whether or not a face image that matches the face image of the person exists among face images of a plurality of criminals registered in the blacklist DB 43a in advance, and outputs alarm information based on the face image used for the collation when it is determined that the face image does not match any of the plurality of criminals. With this configuration, the person monitoring system 100 can determine whether or not the crime by the person (criminal) of having the face image used for the collation is the first offense. Accordingly, the person monitoring system 100 can efficiently support the detection of the unauthorized user in the facility.

The server S1 in the person monitoring system 100 according to Embodiment 1 outputs alarm information in which the face image is associated with a corresponding face image of the matching person already registered in the blacklist DB 43a when the server detects a person matching the face image used for the collation, after outputting the alarm information, based on the captured image received from the first camera CM1A. With this configuration, each of the person monitoring systems 100 and 200 can determine whether or not the person (criminal) having the face image used for the collation is a habitual offender. Accordingly, the person monitoring system 100 can efficiently support the detection of the unauthorized user in the facility.

The server S1 in the person monitoring system 100 according to Embodiment 1 outputs alarm information in which the face image is associated with a corresponding face image of the matching person already registered in the blacklist DB 43*a* when the server detects a person matching the face image used for the collation, after outputting the alarm information, based on a captured image received from a second camera CM1B that captures an image of a place different from an installation place of the first camera CM1A. With this configuration, the person monitoring system 100 can determine whether or not the person (criminal) having the face image used for the collation is a habitual offender. Accordingly, each of the person monitoring systems 100 and 200 can efficiently support the detection of an unauthorized user in the facility.

The server S1 in the person monitoring system 100 according to Embodiment 1 receives detection information based on detection that a passing object having identification information is not invalidated when passing through the gate GT1A. With this configuration, the person monitoring system 100 can detect the occurrence of shoplifting based on the reception of the detection information. Accordingly, the person monitoring system 100 can efficiently support the detection of the unauthorized user in the facility.

Embodiment 2

In Embodiment 1, a case in which shoplifting occurring in a facility is detected and a person who has performed shoplifting is monitored has been described. In Embodiment 2, a case in which a person unauthorizedly uses a fee or a service according to attribute information such as age and gender of the person or use conditions, for example, by falsifying the age will be described. In Embodiment 2, a ticket or an amusement park entrance ticket used for transportation will be described as an example for easy understanding.

Figure 7:
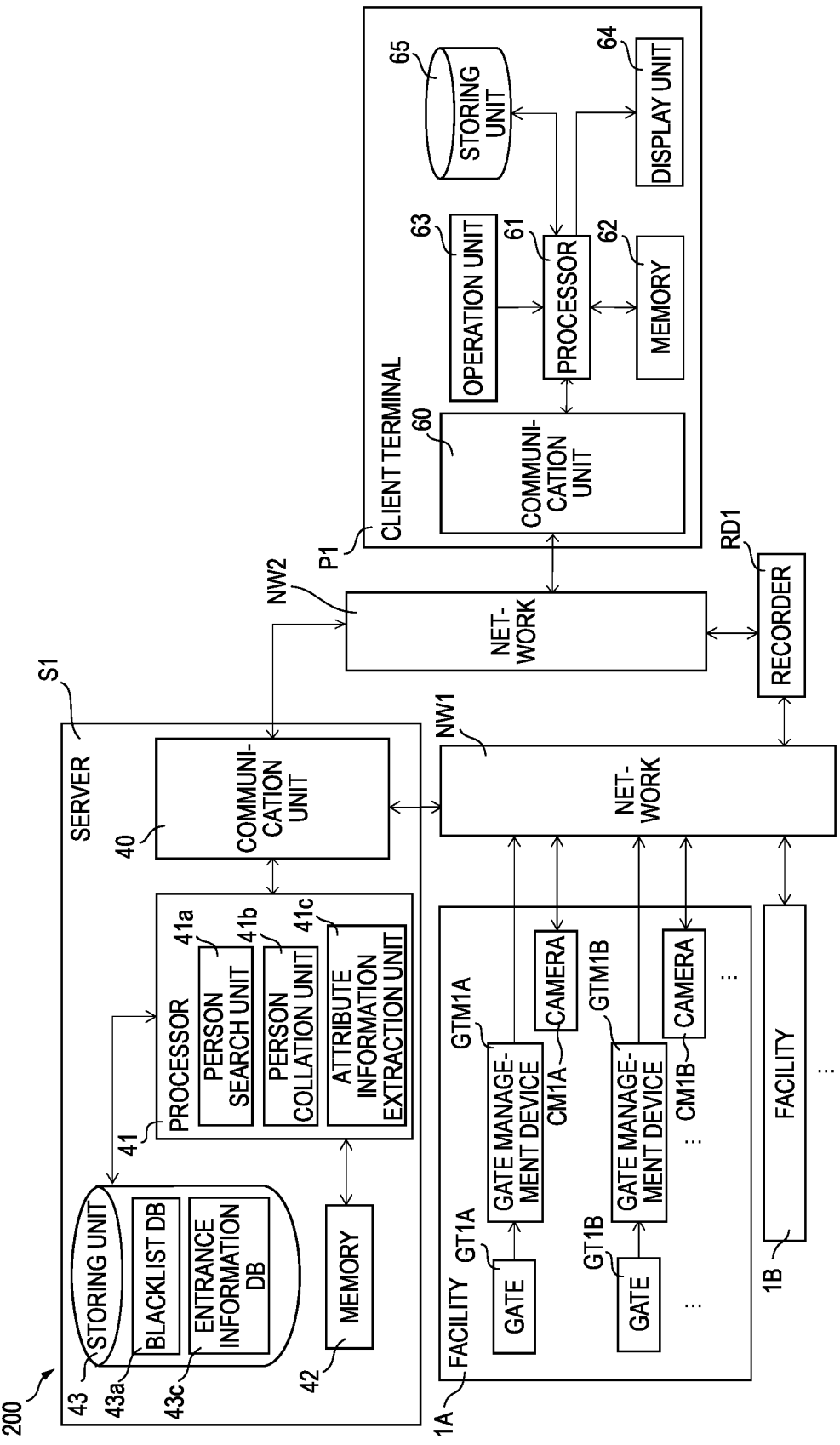
FIG. 7 is a block diagram illustrating an example of an internal configuration of a person monitoring system according to Embodiment 2.

FIG. 7 is a block diagram illustrating an example of an internal configuration of a person monitoring system 200 according to Embodiment 2. The example of the internal configuration of the person monitoring system 200 according to Embodiment 2 has substantially the same configuration as the internal configuration of the person monitoring system 100 according to Embodiment 1. The same components as those in Embodiment 1 are denoted by the same reference numerals, and description thereof is omitted.

Each of the plurality of facilities 1A, . . . according to Embodiment 2 is a facility (for example, a station, an amusement park, or the like) that is owned by the same operating company or management company and requires permission to enter.

Each of the plurality of gates GT1A, . . . according to Embodiment 2 detects entrance information set in, for example, a ticket used for transportation or an amusement park entrance ticket. The entrance information includes attribute information (for example, gender, age, children, elderly, and the like) of a person passing through each of the plurality of gates GT1A, . . . and a use condition (for example, the boarding section of transportation, seats that require an extra fee for the fare, information to receive services that require an extra fee for the entrance fee, and the like) set by the person. The use condition may be omitted when it is automatically determined depending on the attribute information of the person.

Each of the plurality of gate management devices GTM1A, . . . according to Embodiment 2 analyzes the attribute information and the use condition of the person from the entrance information detected by each of the plurality of gates GT1A, . . . , and transmits the information to the server S1 via the network NW1.

The server S1 according to Embodiment 2 receives entrance information from each of the plurality of gate management devices GTM1A, . . . and receives, from each of a plurality of cameras CM1A, . . . that captures an image of each of a plurality of gates GT1A, . . . whose entrance information has been detected, a face image of a person using the entrance information.

The processor 41 according to Embodiment 2 is configured to include the person search unit 41*a*, the person collation unit 41*b*, and an attribute information extraction unit 41*c*. The processor 41 collates the face image of the person received from each of the plurality of cameras CM1A, . . . with each of the plurality of face images of the person stored in the blacklist DB 43*a*. Furthermore, the processor 41 estimates and extracts the attribute information of the person from the face image of the person received from each of the plurality of cameras CM1A, . . . and collates the attribute information based on the extracted face image with the attribute information set in the entrance information. The processor 41 generates alarm information based on these collation results.

The attribute information extraction unit 41*c* estimates and extracts attribute information (for example, gender, age, and the like) of the person from the face image of the person received from each of the plurality of cameras CM1A, . . . . The attribute information extraction unit 41*c* outputs the extracted attribute information of the person to the person search unit 41*a* and the person collation unit 41*b*.

When the entrance information detected from each of the plurality of gate management devices GTM1A, . . . does not match the attribute information based on the face image of the person input by the attribute information extraction unit 41*c*, the person search unit 41*a* searches for the face image of a person received from each of the plurality of cameras CM1A, . . . from each of the plurality of face images of the person stored in the blacklist DB 43*a*. The person search unit 41*a* outputs the search result to the person collation unit 41*b*.

The person collation unit 41*b* collates the search result (face image or captured image having feature points similar to the face image of the person received from each of the plurality of cameras CM1A, . . . ) input from the person search unit 41*a* with a face image of a person received from each of the plurality of cameras CM1A, . . . . The person collation unit 41*b* extracts the attribute information of the person from the face image of the person received from each of the plurality of cameras CM1A, . . . and collates attribute information based on the extracted face image with attribute information set in the entrance information. The person collation unit 41*b* generates alarm information based on these collation results. The person collation unit 41*b* transmits the generated alarm information to the client terminal P1 via the network NW2.

The storing unit 43 according to Embodiment 2 is configured to include the blacklist DB 43*a* and an entrance information DB 43*c*. The storing unit 43 stores, in the entrance information DB 43*c*, the entrance information received from each of the plurality of gate management devices GTM1A, . . . and the information (for example, camera installation place, capturing time of capturing an image of a person, and the like) regarding the camera that has captured the image of the person who has unauthorizedly entered. The information stored in the entrance information DB 43*c* is not limited to the entrance information at the time of unauthorized entrance, but the entrance information entered normally may also be similarly stored. The storing unit 43 stores the face image and captured image of the person and the attribute information based on the face image of the person in the blacklist DB 43*a*. The storing unit 43 stores the information stored in the blacklist DB 43*a* and the information stored in the entrance information DB 43*c* in association with each other. With this configuration, the person monitoring system 100 can extract the history of past unauthorized entrance information of a person, and can determine whether or not the person is the first offender (that is, whether or not the habitual offender) based on the information.

The operation unit 63 according to Embodiment 2 can further input a search item relating to attribute information of a person and a search item relating to entrance information. The search items relating to the attribute information of the person may be, for example, gender, age, and the like, and may be ones by which hairstyles or accessories such as glasses or bags can be searched for. The search items relating to the entrance information include, for example, seats, boarding sections, use services, fees, and option information. The examples of the search item relating to the attribute information of the person and the search item relating to the entrance information described above are not limited to thereto, and may be information that can be extracted from an image or information that can be set in a ticket or the like.

Figure 8:
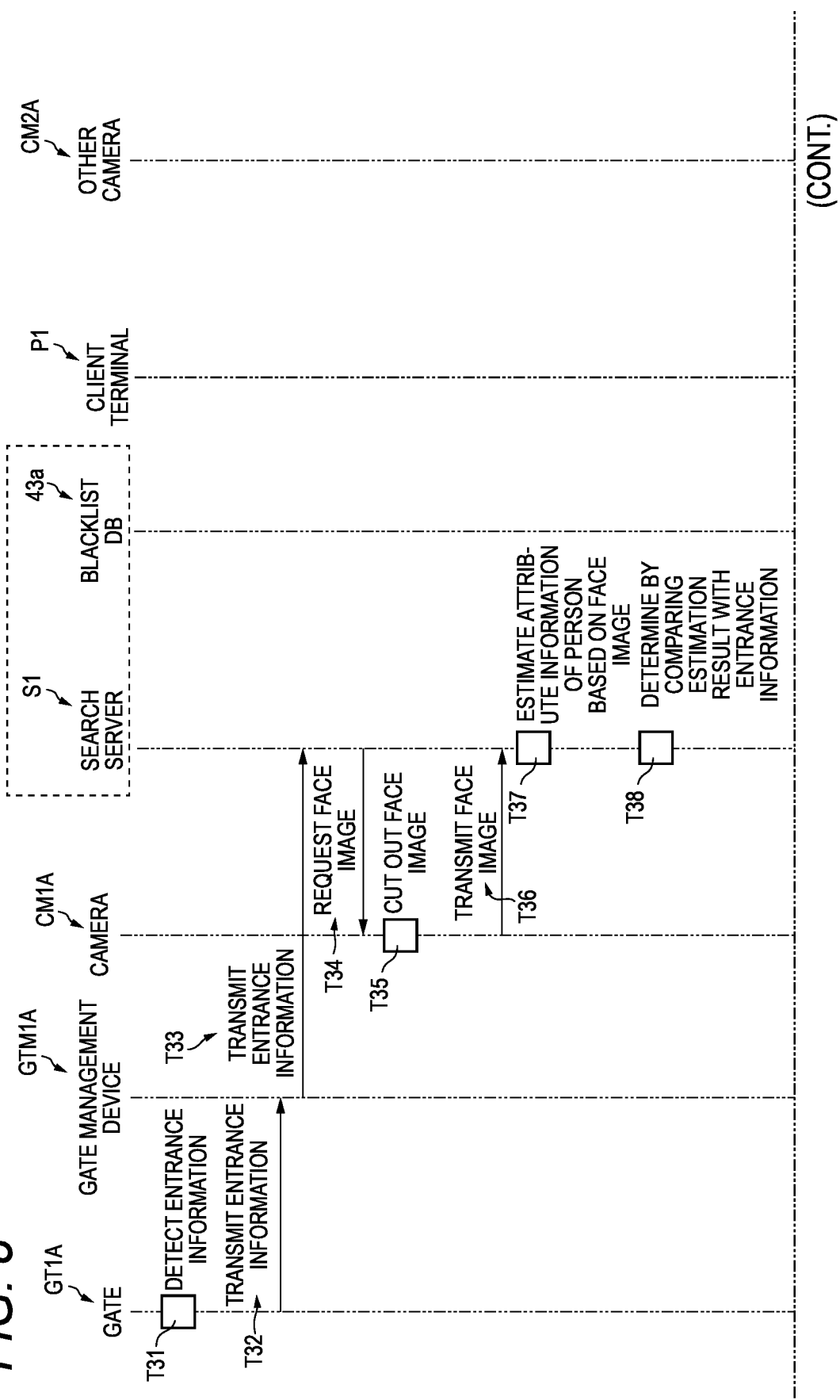
FIG. 8 is a sequence diagram illustrating an example of an operation procedure of the person monitoring system according to Embodiment 2.

FIG. 8 is a sequence diagram illustrating an example of an operation procedure of the person monitoring system 200 according to Embodiment 2. In the description of FIG. 8, the operation procedure of each of the gate GT1A, the gate management device GTM1A, the camera CM1A, and the camera CM2A in the facility 1A will be described.

The gate GT1A detects entrance information based on the passage of a person (T31).

The gate GT1A transmits the detected entrance information to the gate management device GTM1A (T32).

The gate management device GTM1A analyzes attribute information of the person and the use condition in the received entrance information, and transmits the entrance information to the server S1 via the network NW1 (T33).

Based on the entrance information received from the gate management device GTM1, the server S1 transmits a control signal requesting a face image of a person who has entered the facility 1A using the entrance information to the camera CM (T34).

The camera CM1A executes processing of cutting out a face image of a person from a captured image in which a person who has entered the facility 1A is reflected by using the entrance information, based on the control signal received from the server S1 (T35).

The camera CM1A transmits the cut out face image to the server S1 via the network NW1 (T36).

The server S1 estimates attribute information (for example, gender, age, and the like) of the person based on the received face image (T37).

The server S1 compares the attribute information (estimated result) based on the estimated face image with the attribute information set in the entrance information to determine whether or not the entrance is unauthorized (T38).

When it is determined, in processing of step T38, that the entrance is unauthorized, the server S1 outputs the face image of the person to the blacklist DB 43*a* (T39).

In the blacklist DB 43*a*, the face image of the person input from the server S1 is registered (T40).

When it is determined, in processing of step T38, that the entrance is unauthorized, the server S1 collates the face image or captured image of each of the plurality of persons, who have unauthorizedly entered in the past, stored in the blacklist DB 43*a* with the face image received from the camera CM1A. When the face image or captured image of the matching person as the received face image is not stored based on the collation result, the server S1 generates fraud detection information including an alert notification indicating that unauthorized entrance has occurred and alarm information indicating that the person who has unauthorizedly entered is the first offender. The server S1 transmits the generated fraud detection information to the client terminal P1 via the network NW2 (T41).

When an image of a person who has unauthorizedly entered is captured by the camera CM1A, the server S1 executes control to cause the camera CM1A to cut out and transmit the face image of the person. Such control is similarly performed not only for the camera CM1A but also for a camera that captures an image of another gate or a camera that captures an image of a place other than the gate.

The client terminal P1 performs an alert notification of the occurrence of unauthorized entrance based on the received fraud detection information, and displays the fraud detection information (T42).

The other camera CM2A is a camera installed at a gate of another facility different from the camera CM1A or at an arbitrary position, and detects, from the captured image, the person who has unauthorizedly entered detected in processing of step T31, and executes face image cutout processing (T43). In the processing of step T43, the image of the person may be captured and detected by another camera CM2A not only when the person, who has unauthorizedly entered, has unauthorizedly entered again, for example, when the person enters another facility or while moving through another facility.

The other camera CM2A transmits the face image of the person who has unauthorizedly entered to the server S1 via the network NW1 (T44).

The server S1 requests a face collation for the received face image (T45). Specifically, the person search unit 41*a* searches for the matching person from the face images or captured images of a plurality of persons stored in the blacklist DB 43*a* of the storing unit 43 for the matching person, based on the received face image.

The server S1 executes the face collation based on the received face image and the face image or captured image obtained by the search (T46). Specifically, the person collation unit 41*b* collates and determines whether or not the received face image and the search result by the person search unit 41*a* are the matching person, based on the received face image and the search result by the person search unit 41*a*.

The server S1 outputs a face image or captured image of the matching person as the person having the face image among the face images or captured images of a plurality of persons stored of the blacklist DB 43*a*, as a collation result (T47).

The server S1 determines that the person of the received face image is not the first offender (that is, a habitual offender) based on the collation result and generates a fraud alert notification indicating that unauthorized entrance has occurred, and fraud detection information (alarm information) indicating that the person who has unauthorizedly entered is the habitual offender. The server S1 transmits the alert notification and the fraud detection information (alarm information) to the client terminal P1 via the network NW2 (T48).

The client terminal P1 performs the fraud alert notification based on the received fraud detection information, and displays the alarm information (T49).

Thereafter, the person monitoring system 200 according to Embodiment 2 can repeatedly execute the detection of the person stored in the blacklist DB 43a, cause the client terminal P1 to display information of the detected person, and efficiently support the detection of an unauthorized user in the facility. With this configuration, the client can efficiently monitor a habitual unauthorized entrance offender.

In the person monitoring system 200 according to Embodiment 2, at least one camera CM1A and the server S1 are communicably connected to each other, the server S1, based on reception of detection information of a predetermined event (for example, unauthorized use of a ticket, an entrance ticket, or the like) from a gate GT1A that regulates passage when the predetermined event is detected, requests a first camera CM1A, that captures an image of a capturing area including the gate GT1A, for a face image of a person near the gate GT1A when the predetermined event occurs. The first camera CM1A captures an image of the person near the gate GT1A when the predetermined event occurs, and transmits a face image obtained by cutting out a range in which the face of the person is reflected from the captured image of the person to the server S1. The server S1 outputs alarm information based on the face image and registers the face image in the blacklist DB 43a as an example of a database.

With this configuration, the person monitoring system 200 according to Embodiment 2 can detect a predetermined event, receive a face image of a person near the gate GT1A when the predetermined event occurs, based on the reception of the detection information of the predetermined event from the gate GT1A that regulates passage, output alarm information based on the face image, and register the face image in the blacklist DB 43a. Accordingly, the person monitoring system 200 can efficiently support detection of the unauthorized user in the facility.

The server S1 in the person monitoring system 200 according to Embodiment 2 collates whether or not a face image that matches the face image of the person exists among face images of a plurality of criminals registered in the blacklist DB 43a, as an example of a database, in advance and outputs alarm information based on the face image used for the collation when it is determined that the face image does not match any of the plurality of criminals. With this configuration, the person monitoring system 200 can determine whether or not the crime by the person (criminal) having the face image used for the collation is the first offense. Accordingly, the person monitoring system 200 can efficiently support the detection of the unauthorized user in the facility.

The server S1 in the person monitoring system 200 according to Embodiment 2 outputs alarm information in which the face image is associated with a corresponding face image of the matching person already registered in the blacklist DB 43a when the server detects a person matching the face image used for the collation based on the captured image received from the first camera CM1A, after outputting the alarm information. With this configuration, the person monitoring system 200 can determine whether or not the person (criminal) having the face image used for the collation is a habitual offender. Accordingly, the person monitoring system 200 can efficiently support the detection of the unauthorized user in the facility.

The server S1 in the person monitoring system 200 according to Embodiment 2 outputs alarm information in which the face image is associated with a corresponding face image of the matching person already registered in the blacklist DB 43a when the server detects a person matching the face image used for the collation, after outputting the alarm information, based on a captured image received from a second camera CM1B that captures an image of a place different from an installation place of the first camera CM1A. With this configuration, the person monitoring system 200 can determine whether or not the person (criminal) having the face image used for the collation is a habitual offender. Accordingly, the person monitoring system 200 can efficiently support the detection of the unauthorized user in the facility.

The server S1 in the person monitoring system 200 according to Embodiment 2 receives the detection information having a use condition as an example of age group information permitting passage of a passing object, analyzes the age of the person based on a captured image in which the person is reflected from the first camera CM1A, and collates the use condition included in the received detection information with attribute information of the person when the analysis result (that is, attribute information of the person) of the age of the person is not included in the use information that permits the passage of the passing object. With this configuration, the person monitoring system 200 can detect the unauthorized use of the passing object based on a mismatch between the use condition and the attribute information of the person. Accordingly, the person monitoring system 200 can efficiently support detection of the unauthorized user in the facility.

While various embodiments have been described as above with reference to the accompanying drawings, the present disclosure is not limited to such embodiments. It will be apparent to those skilled in the art that various changes, modifications, substitutions, additions, deletions, and equivalents can be made within the scope of the claims and it is understood that these also belong to the technical scope of the present disclosure. Further, the components in the various embodiments described above may be arbitrarily combined without departing from the spirit of the invention.

The present disclosure is useful in presenting a person monitoring system and a person monitoring method as presenting a person monitoring system and a person monitoring method capable of efficiently supporting detection of an unauthorized user in a facility.

The present application is based upon Japanese Patent Application (Patent Application No. 2019-101815 filed on May 30, 2019), the content of which is incorporated herein by reference.

What is claimed is:

1. A person monitoring system, comprising:
at least one camera; and
a server that is communicably connected to the at least one camera and to a database, the database including a plurality of face images, the plurality of face images being registered in the database in response to occurrences of a predetermined event, wherein
the server is configured to, based on reception of detection information of the predetermined event from a gate that regulates passage in response to a detection of the predetermined event, request a first camera of the at least one camera, that captures an image of a capturing area including the gate, for a face image of a person near the gate when the predetermined event occurs,
the first camera is configured to capture an image of the person near the gate when the predetermined event occurs, and transmit, to the server, the face image of the person obtained by cutting out a range having a face of the person from the image of the person,
the server is configured to determine whether the face image of the person matches any of the plurality of face images registered in the database, the server is configured to output alarm information based on the face image and a determination result of whether the face image of the person matches any of the plurality of face images registered in the database, the alarm information includes a display screen, with the display screen including a first display area and a second display area, in a first case in which the person is a first offender and the determination result indicates that the face image of the person does not match any of the plurality of face images registered in the database, the face image of the person is displayed in the first display area and nothing is displayed in the second display area, in a second case in which the person is a repeat offender and the determination result indicates that the face image of the person matches a corresponding face image of the plurality of face images registered in the database, the face image of the person is displayed in the first display area and the corresponding face image is displayed in the second display area, and the face image of the person, which is displayed in the first display area and obtained by cutting out the range of the face of the person from the image captured by the first camera, being different than the corresponding face image, which is displayed in the second display area in the second case and registered in the database.

2. The person monitoring system according to claim 1, wherein the server is configured to collate whether or not the face image of the person that matches any of the plurality of face images exists among face images of a plurality of criminals registered in the database in advance, and output the alarm information based on the face image when the server determines that the face image does not match any of the face images of the plurality of criminals.

3. The person monitoring system according to claim 1, wherein the server is configured to, when the server determines the face image received from the first camera matches the corresponding face image of the plurality of face images registered in the database, output the alarm information in which the face image is associated with the corresponding face image already registered in the database.

4. The person monitoring system according to claim 1, wherein the server is configured to register the face image in the database in response to the face image of the person not matching any of the plurality of face images registered in the database.

5. The person monitoring system according to claim 4, wherein the server is configured to, after outputting the alarm information, when the server receives the face image of the person from a second camera of the at least one camera that captures an image of a place different from the capturing area of the first camera, output second alarm information in which the face image of the person is associated with the corresponding face image already registered in the database.

6. The person monitoring system according to claim 1, wherein the server is configured to receive the detection information based on detection that a passing object having identification information is not invalidated when passing through the gate.

7. The person monitoring system according to claim 1, wherein the server is configured to receive the detection information including age group information used for permitting a person to pass the gate, analyze an age of the person near the gate based on an image having the person received from the first camera, and collate the age group information included in the detection information with an analysis result of the age of the person near the gate when an analysis result of the age of the person is not satisfied with the age group information.

8. A person monitoring method performed by a person monitoring system, the person monitoring system including at least one camera, and a server that is communicably connected to the at least one camera and to a database, the database including a plurality of face images, the plurality of face images being registered in the database in response to occurrences of a predetermined event, the person monitoring method comprising:

by the server, based on reception of detection information of the predetermined event from a gate that regulates passage in response to a detection of the predetermined event, requesting a first camera of the at least one camera, that captures an image of a capturing area including the gate, for a face image of a person near the gate when the predetermined event occurs;

by the first camera, capturing an image of the person near the gate when the predetermined event occurs;

by the first camera, transmitting, to the server, the face image of the person obtained by cutting out a range having a face of the person from the image of the person;

by the server, determining whether the face image of the person matches any of the plurality of face images registered in the database; and by the server, outputting alarm information based on the face image and a determination result of whether the face image of the person matches any of the plurality of face images registered in the database, wherein the alarm information includes a display screen, with the display screen including a first display area and a second display area, in a first case in which the person is a first offender and the determination result indicates that the face image of the person does not match any of the plurality of face images registered in the database, the face image of the person is displayed in the first display area and nothing is displayed in the second display area, in a second case in which the person is a repeat offender and the determination result indicates that the face image of the person matches a corresponding face image of the plurality of face images registered in the database, the face image of the person is displayed in the first display area and the corresponding face image is displayed in the second display area, and the face image of the person, which is displayed in the first display area and obtained by cutting out the range of the face of the person from the image captured by the first camera, being different than the corresponding face image, which is displayed in the second display area in the second case and registered in the database.

9. The person monitoring method according to claim 8, further comprising:
   by the server, registering the face image in the database in response to the face image of the person not matching any of the plurality of face images registered in the database.

\* \* \* \* \*